April 28, 1931.  C. T. SMALL  1,802,484
VARIABLE FRICTION GEAR
Original Filed Feb. 17, 1926
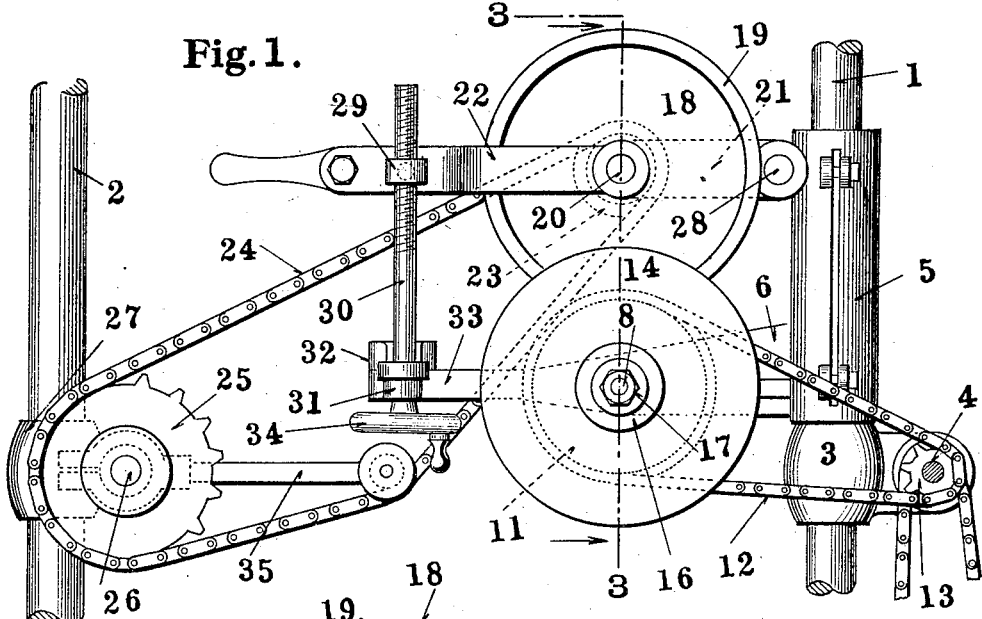
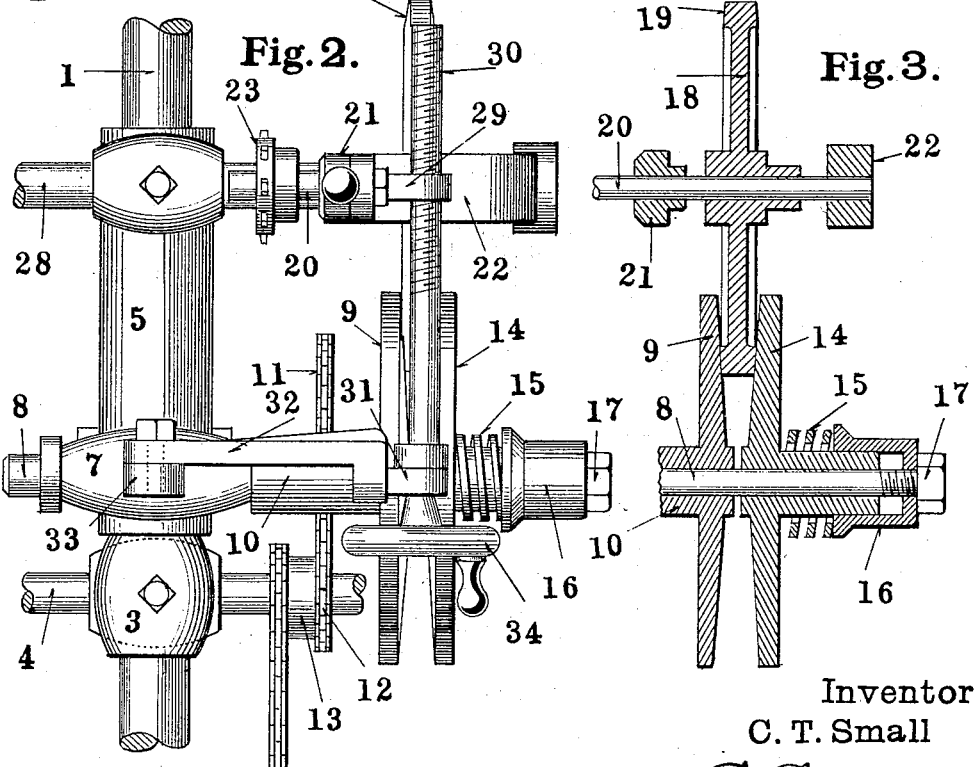
Inventor
C. T. Small
By E. E. Huffman
Att'y.

Patented Apr. 28, 1931

1,802,484

UNITED STATES PATENT OFFICE

CHESLEY T. SMALL, OF ST. LOUIS, MISSOURI

VARIABLE-FRICTION GEAR

Original application filed February 17, 1926, Serial No. 88,765. Divided and this application filed February 25, 1928. Serial No. 256,998.

My invention relates to a variable friction gear and is particularly adapted for driving the feed reel of a can filling machine, such as that shown and described in my application Serial No. 88,765 filed February 17, 1926, which application resulted in Patent No. 1,776,263 of June 24, 1930, of which application the present application is a division. It may be used, however, in other constructions where it is desirable to vary the ratios between a driving and a driven member.

In the accompanying drawings, which illustrate one form of gear made in accordance with my invention, Figure 1 is a side elevation; Figure 2 is a view taken at right angles to Figure 1; and Figure 3 is a section taken on the line 3—3 of Figure 1.

The frame of the machine comprises four corner parts or uprights two of which 1 and 2 are shown in the drawings. Secured to the upright 1 is a bearing 3 in which is journaled a shaft 4, to which power is applied by suitable gearing (not shown). Clamped to the upright 1 above the bearing 3 is sleeve 5 carrying an arm 6 provided with a hub 7 in which is journaled a shaft 8. Mounted on this shaft is a friction disk 9 on the hub 10 of which is a sprocket gear 11 connected by a sprocket chain 12 with a sprocket gear 13 on the driving shaft 4. Mounted on the shaft 8 adjacent to the first named friction disk is a second friction disk 14 which is forced toward the disk 9 by a coil spring 15 surrounding the hub. The tension of the spring may be varied by a cap 16 bearing against it and adjustable by means of a nut 17. The opposing faces of the disks are slightly beveled, as shown in somewhat exaggerated form in Figure 3. Arranged between these disks is a third friction disk 18 having, adjacent to its periphery on each side, a narrow portion 19 beveled to correspond to the bevel on the opposing faces of the disks 9 and 14. The disk 18 is mounted on a shaft 20 so as to rotate therewith but to be capable of slight longitudinal movement relative thereto. This shaft is journaled at the inner side of the disk in an arm 21 pivoted at 28 to the sleeve 5 and at the outer side of said disk to a Z-shaped piece 22 carried by the arm. On the shaft 20, adjacent to the arm 21, is a sprocket wheel 23 around which passes a sprocket chain 24 which also passes around a sprocket wheel 25 on the driven shaft 26. This shaft is journaled in a bearing 27 mounted on the upright 2 and extending to the driven mechanism, in this case the feed reel (not shown) of the filling machine.

In order to swing the arm 21 on its pivot 28 and thus move the disk 18 relative to the disks 9 and 14 to vary the speed of transmission, said arm is provided with a swiveled internally threaded eye 29 engaged by a threaded rod 30. The threaded rod 30 is journaled in a swiveled block 31 carried by an arm 32 carried by an extension 33 of the arm 6 and has at its lower end a hand wheel 34 by means of which it may be rotated to raise and lower the arm 21 and attached bar 22. A chain tightener 35 is necessary to take up the slack in the chain 24 and thus compensate for the variation in the distance between shafts 20 and 26 when the disk 18 is raised and lowered. Owing to the fine adjustment between the centers of the driving and driven disks obtainable by means of the screw 30, the ratios between the driving and driven speed may be controlled with extreme accuracy.

Having fully described my invention, what I claim as new and desire to secure by Letters Patent of the United States is:

1. The combination with a machine frame provided with a pair of uprights, of a sleeve surrounding one of said uprights, a fixed arm carried by said sleeve, a pair of friction disks mounted thereon, a pivotal arm also carried by said sleeve, a friction disk mounted thereon and movable in the direction of its axis, said third disk being movable radially between said first named disks by the movement of said pivotal arm, a driving shaft carried on the other upright, and a flexible driving connection between said shaft and said third disk.

2. The combination with a machine frame provided with a pair of uprights, of a sleeve surrounding one of said uprights, a fixed arm carried by said sleeve, a pivoted arm also carried by said sleeve, a friction member comprising a pair of disks mounted on one of said arms, a friction member comprising a third disk mounted on the other of said arms and movable in the direction of its axis, said third disk being positioned between said first named disks, said friction members being movable relatively in a radial direction by the movement of said pivoted arm, a driving shaft carried on the other upright, and a flexible driving connection between said shaft and the friction member mounted on the pivoted arm.

In testimony whereof, I hereunto affix my signature, this 21st day of February, 1928.

CHESLEY T. SMALL.